United States Patent
Pickering et al.

(10) Patent No.: US 8,406,135 B2
(45) Date of Patent: Mar. 26, 2013

(54) METHOD AND APPARATUS FOR COMMUNICATING DATA OVER A DATA NETWORK

(75) Inventors: Ashley Pickering, Ipswich (GB); Philip Everett, Ipswich (GB); Norwin Simms, Belfast (GB); Gary Dalby, Barking Tye (GB); Trevor Linney, Stowmarket (GB)

(73) Assignee: British Telecommunications Public Limited Company, London (GB)

( * ) Notice: Subject to any disclaimer, the term of this patent is extended or adjusted under 35 U.S.C. 154(b) by 579 days.

(21) Appl. No.: 11/989,408

(22) PCT Filed: Jul. 28, 2006

(86) PCT No.: PCT/GB2006/002818
§ 371 (c)(1),
(2), (4) Date: Jan. 25, 2008

(87) PCT Pub. No.: WO2007/012867
PCT Pub. Date: Feb. 1, 2007

(65) Prior Publication Data
US 2009/0262647 A1    Oct. 22, 2009

(30) Foreign Application Priority Data
Jul. 29, 2005  (EP) .................................. 05254769
Mar. 22, 2006  (EP) .................................. 06251521

(51) Int. Cl.
*G01R 31/08* (2006.01)
*G01F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04J 3/16* (2006.01)
*H04J 3/22* (2006.01)
*H04M 11/00* (2006.01)
*H04M 15/00* (2006.01)

(52) U.S. Cl. ..... 370/232; 370/253; 370/465; 379/93.01; 379/114.06

(58) Field of Classification Search .................. None
See application file for complete search history.

(56) References Cited

U.S. PATENT DOCUMENTS
5,889,470 A    3/1999   Kaycee et al.
(Continued)

FOREIGN PATENT DOCUMENTS
EP          1 079 658 A2    2/2001
WO    WO 2004/091144 A1   10/2004

OTHER PUBLICATIONS

International Search Report for PCT/GB2006/002818 mailed Sep. 25, 2006.

(Continued)

*Primary Examiner* — Xavier Szewai Wong
(74) *Attorney, Agent, or Firm* — Patterson Thuente Pedersen, P.A.

(57) ABSTRACT

A Digital Subscriber Line Access Multiplexer (DSLAM) is modified to monitor when a line synchronizes (i.e. sets up a DSL connection) and to automatically generate a notification to be sent to a management device of the access network if the rate has changed from the last time the line synchronized.

9 Claims, 4 Drawing Sheets

U.S. PATENT DOCUMENTS

| | | | | |
|---|---|---|---|---|
| 6,374,288 | B1 * | 4/2002 | Bhagavath et al. | 709/203 |
| 6,580,727 | B1 * | 6/2003 | Yim et al. | 370/463 |
| 6,963,538 | B1 * | 11/2005 | Giroux et al. | 370/236.1 |
| 8,027,270 | B1 * | 9/2011 | Campana et al. | 370/252 |
| 2002/0141443 | A1 * | 10/2002 | Christensen et al. | 370/468 |
| 2004/0146072 | A1 * | 7/2004 | Farmwald | 370/537 |
| 2008/0095188 | A1 * | 4/2008 | Remy et al. | 370/468 |

OTHER PUBLICATIONS

Extended European Search Report dated Sep. 6, 2006 in EP 06 25 1521.8.

Written Opinion of the International Searching Authority mailed Sep. 25, 2006 in PCT/GB/2006/002818.

* cited by examiner

US 8,406,135 B2

METHOD AND APPARATUS FOR COMMUNICATING DATA OVER A DATA NETWORK

This application is the U.S. national phase of International Application No. PCT/GB2006/002818, filed 28 Jul. 2006, which designated the U.S. and claims priority to European Patent Application Nos. 05254769.2, filed 29 Jul. 2005, and 06251521.8, filed 22 Mar. 2006, the entire contents of each of which are hereby incorporated by reference.

FIELD OF THE INVENTION

The present invention relates to a method and apparatus for communicating data over a data network. In particular, it relates to an access device or sub-system such as a Digital Subscriber Line Access Multiplexer (DSLAM) or similar access node terminating a digital subscriber line, a method of operating such an access device and an access network including one or more such access devices.

BACKGROUND TO THE INVENTION

ITU recommendation G992.1 specifies how the maximum bandwidth which can be supported over a particular ADSL connection between a particular Remote ADSL Transceiver Unit (ATU-R) and a particular Central office or network operator ADSL Transceiver Unit (ATU-C) may be determined at the time of initiation of the ADSL connection (see G992.1 Chapter 10) and may even be periodically re-negotiated during a connection (see G992.1 Appendix II); the maximum bandwidth in fact depends upon various factors which will differ from line to line and from time to time depending on things such as the amount of electromagnetic noise present in the environment of the ATU-R, etc.

However, despite this, it is common in most practical implementations of ADSL for a network operator to offer an end user a fixed bandwidth (commonly offered values being 500 kb (kilo bits/second), 1 Mb (Mega bits/second) and 2 Mb). In such circumstances, the initiation process happens in the standard way to establish the maximum bandwidth available over the connection, but instead of then setting up the connection at that maximum setting, it is simply checked whether or not this maximum is at least equal to the contractually agreed bandwidth, and if so, then the connection is made at this agreed amount (rather than the maximum available) but otherwise the connection is just not made at all.

Because an access network is likely to contain a large number of DSLAMs they have generally been designed to operate as autonomously as possible. As such, although they will generally store some useful data about each digital subscriber line (hereinafter referred to simply as a "line") to which it is connected such as the theoretical maximum rate at which the line could have been connected last time an ADSL connection was set up over the line, each DSLAM operates according to a server client model where each DSLAM operates as a server and only reacts to requests issued to it from a client. Thus in current DSLAMs, in order to access information about an individual line a requesting device generally needs to issue a request to the DSLAM and await a response.

SUMMARY OF THE INVENTION

According to a first aspect of the present invention, there is provided an access device including a plurality of digital subscriber line modems for terminating a plurality of corresponding digital subscriber lines and connecting them to an access network, the access device being operable to monitor one or more of the digital subscriber lines and to generate and transmit a message to another device in dependence upon the results of monitoring the one or more digital subscriber lines.

According to a second aspect of the present invention, there is provided a method of operating an access device including a plurality of digital subscriber line modems for terminating a plurality of corresponding digital subscriber lines and connecting them to an access network, the method comprising: monitoring one or more of the digital subscriber lines; and generating and transmitting a message to another device in communication with the multiplexer in dependence upon the results of the monitoring step.

In the case that the access device is a DSLAM, this means that the DSLAM no longer acts purely in a server role. That is to say, instead of responding only when requested to do so by another device, the DSLAM can generate and transmit messages purely as a result of its own internal processes. Preferably, the DSLAM monitors events to do with the establishment of Digital Subscriber Line (DSL) connections over the DSL's and determines if one or more certain predetermined conditions or sets of conditions arise.

Preferably, for example, the DSLAM monitors any lines which are operating in a rate adaptive mode (i.e. where the lines connect up at a data rate which depends on the actual circumstances present within the system at the time the connection is made—e.g. at the maximum possible speed achievable (for a given noise margin and mode of operation (i.e. fixed or interleaved) rather than at a fixed pre-agreed rate) and whenever there is a change in the rate at which a particular line has connected up (but most preferably only when the change exceeds a minimum threshold), the DSLAM (or, in an alternative embodiment, a management device acting as an intermediary between the DSLAM and a central management device associated with the access network) automatically generates a message indicating the new rate at which the line is connected and transmits this to a management device associated with the access network which can then use the information to make any necessary corresponding changes to other components within the access network, such as a corresponding Broadband Remote Access Server (BRAS).

In certain embodiments, each DSLAM may transmit the messages which it generates to a device such as an element manager or a data collector which interfaces between, or aggregates messages received from, a subset of the total number of DSLAMs operating within the access network and then forwards the (possibly aggregated) messages to a centralised management function (which may be distributed over a number of separate hardware devices) for further processing of the messages and subsequent control of other devices within the access network (and possibly beyond the access network, e.g. to an associated service provider etc.).

The term Digital Subscriber Line Access Multiplexer (DSLAM) is a well known term in the art and the term is used throughout this specification to refer to such devices, but is also intended to include any device housing one or more units (e.g. ATU-C's) which terminate (at the network end of a twisted copper pair line) an xDSL connection (xDSL refers to any of the standards for transmitting much more than 64 kb of data over a copper line, by using frequencies greater than those required for transmitting analogue voice signals, such standards including ADSL SDSL, HDSL and VDSL—further including any further similar standards not yet developed), since subsequent devices might not be known as DSLAMs even though they perform a similar function (i.e. of terminating a number of digital subscriber lines and aggregating them into a higher bandwidth transmission medium of an access network). By comparison with the Technical Report of the DSL Forum TR-059, the term DSLAM as we intend it to be used is more closely aligned to the term "Access Node" used in that document. The term "Access Device or Subsystem" is also intended to be understood in this way.

Further aspects of the invention include processor implementable instructions for causing a processor controlled device to carry out the method of the first aspect of the present invention and carrier means carrying such processor implementable instructions.

BRIEF DESCRIPTION OF THE FIGURES

In order that the present invention may be better understood, embodiments thereof will now be described, by way of example only, with reference to the accompanying drawings in which.

DETAILED DESCRIPTION OF EMBODIMENTS

Figure 1:
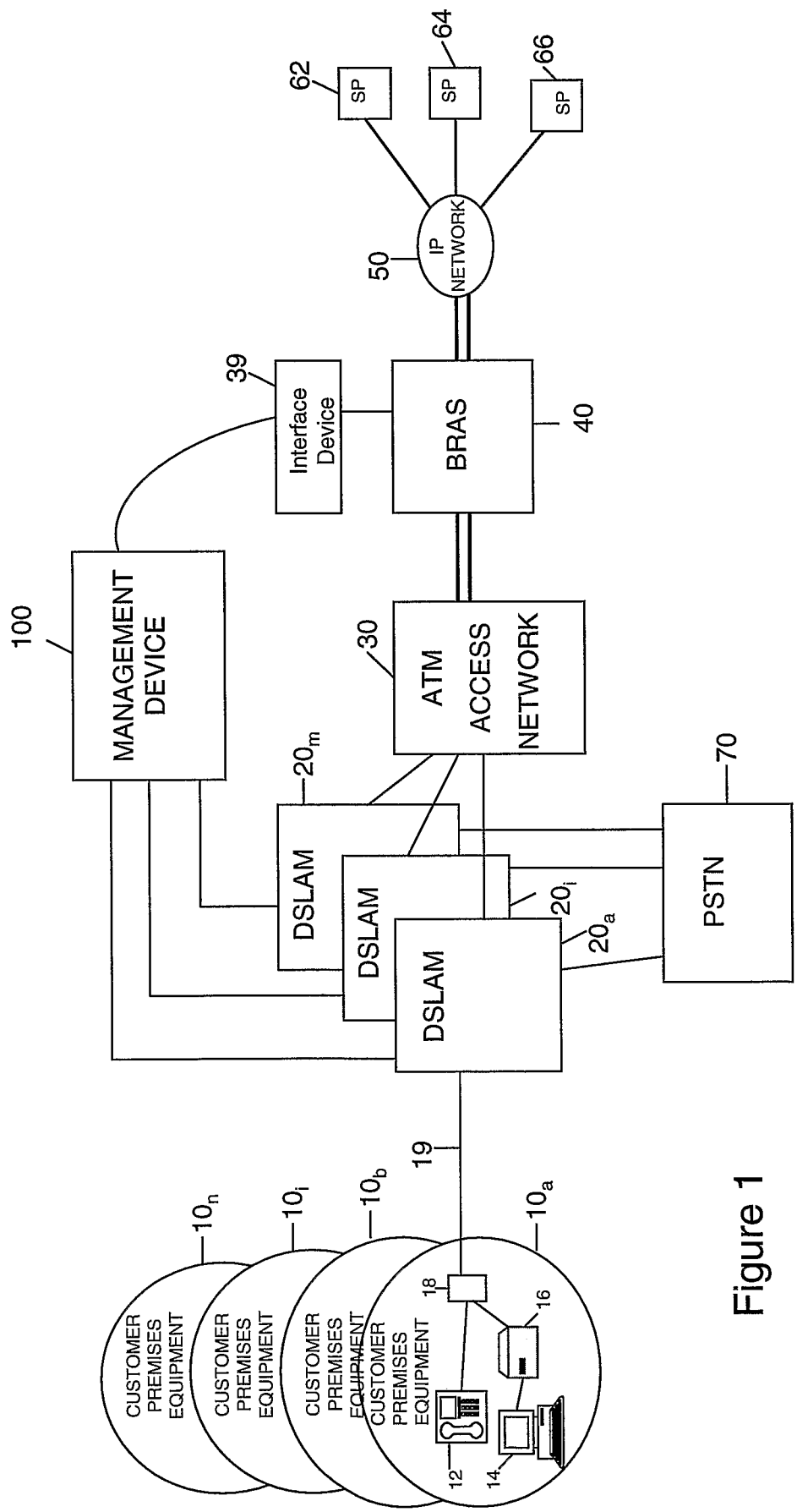
FIG. 1 is a schematic block diagram illustrating a telecommunications network incorporating a plurality of DSLAMs according to a first aspect of the present invention.

Referring to FIG. 1, a first embodiment of the present invention is illustrated in overview. Copper pair loops 19 connect a number of sets of customer premises equipment $10_a$, $10_b$ ... $10_i$ ... $10_n$ to a smaller number of DSLAMs $20a$ ... $20_i$, ... $20_j$. Each DSLAM is typically located within a local exchange (also known as a central office in the US) each of which may house one or more DSLAMs. Each DSLAM 20 separates normal voice traffic and data traffic and sends the voice traffic to the Public Switched Telephone Network (PSTN) 70. The data traffic is passed on through an Access Network 30 (which will typically be an ATM network as is assumed in this embodiment) toga Broadband Remote Access Server (BRAS) 40 at which several IP traffic flows from (and to) multiple Service Providers (SP's) 62, 64, 66 are aggregated (and disaggregated) via an IP network 50 (which may, of course, itself be provided on top of an ATM network). Note that although only a single BRAS is shown, in practice a large access network will include a large number of BRAS's. Within each set of customer premises equipment 10, there is typically an ADSL splitter filter 18, a telephone 12, an ADSL modem 16 and a computer 14.

In addition to the above mentioned items, in the present embodiment, there is also a management device 100 which communicates between the DSLAMs 20 and the BRAS (or BRAS's) 40. In the present embodiment, the management device communicates with individual BRAS's via one or more further interface devices 39 each of which communicates directly with one or more BRAS's in order to set user profiles, etc. A detailed understanding of the operation of the management device, the interface device(s) and the BRAS(s) is not required in order to understand the present invention, however, for completeness an overview of their operation is set out below. For a more detailed discussion, the reader is referred to co-pending European patent application No. 05254769.2 the contents of which are incorporated herein by reference. Thus, in overview, the management device 100 obtains information from each DSLAM 20 about the rate at which each Digital Subscriber Line (DSL) connects to the DSLAM (as is discussed in greater detail below, in the present embodiment this is done by each DSLAM generating and transmitting to the management device 100 a message indicating the new line rate each time a line connects up at a speed which differs from the speed at which the line last connected up—or synchronised as this process is commonly termed).

In the present embodiment, the management device then processes this information to assess a consistent connection speed achieved by each such DSL. If it determines that this consistent rate has increased as a result of recent higher rate connections, it instructs the BRAS to allow higher through flows of traffic for that DSL. On the other hand, if it detects that a particular connection speed is below the stored consistent value, it reduces the consistent value to the current connection rate and immediately informs the BRAS of the new consistent value rate so that the BRAS does not allow more traffic to flow to the DSL than the DSL is currently able to cope with.

The exact algorithm used by the management device to calculate the consistent rate in the present embodiment is not pertinent to the present invention and therefore is not described. However, it should be noted that the intention of the algorithm is to arrange that the user will receive data at the highest rate which his/her DSL is consistently able to obtain without requiring the BRAS to be reconfigured every time the DSL is connected. At the same time the algorithm seeks to ensure that if the DSL connects at a rate which is below that at which the BRAS is currently configured to allow data through, then the BRAS is quickly reconfigured to avoid overloading the DSLAM. The reason for wanting to avoid having to contact the BRAS each time a DSL connects to the DSLAM is because with current systems it is not generally possible to reconfigure the BRAS without a significant delay (e.g. of a few minutes). Furthermore, there is a limit to the rate at which a BRAS can process reconfiguration requests. These restrictions are sometimes referred to by saying that the BRAS needs to be provisioned, and drawing a distinction between systems which are switched (e.g. ATM Switched Virtual Circuits) and systems which are provisioned. Current systems allow for quite quick provisioning (often a matter of minutes rather than days or weeks) but there is still a significant difference between such quick provisioning and realtime switching.

Figure 2:
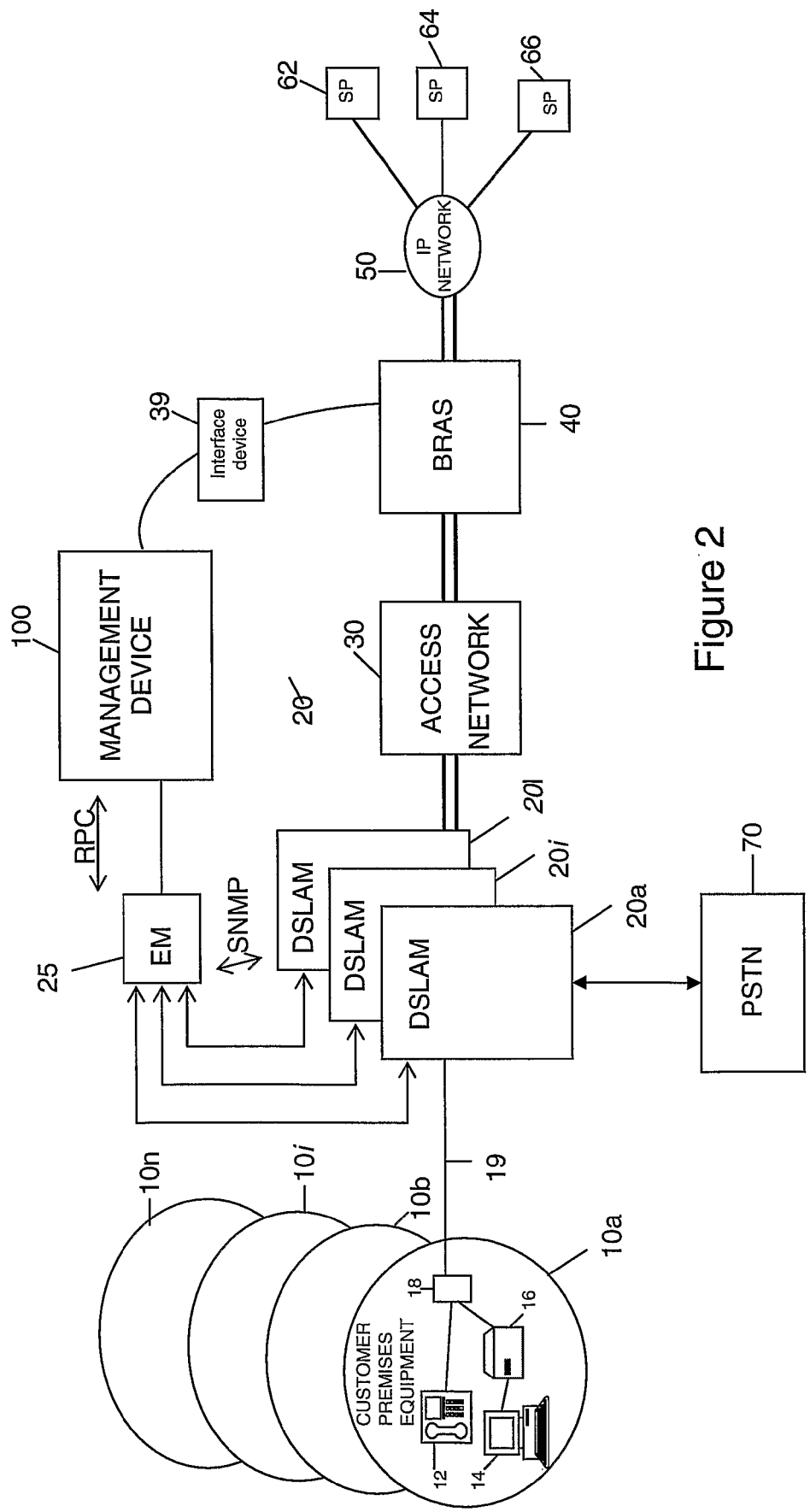
FIG. 2 is a schematic block diagram illustrating an alternative telecommunications network similar to that of FIG. 1, but further including a plurality of element manager devices which interface between a subset of the DSLAMs and a management device which ultimately receives messages from the DSLAMs.

FIG. 2 shows an alternative embodiment to that of FIG. 1 which is very similar and common reference numerals have been used to describe common elements. The main difference is simply that in FIG. 2, instead of the DSLAMs communicating notification messages directly to the management device 100, an element manager device 25 (which connects to a plurality of DSLAMs) acts as an interface between the DSLAMs and the management device. Note that in a large access network, there may be many DSLAMs and several element managers, each of which may connect to a sub-set of the DSLAMs. Furthermore, additional levels of hierarchy could be imposed where a number of element managers communicate with an element manager manager which then interfaces to the management device, etc.

The embodiment of FIG. 2 can be operated in at least two slightly different ways in order to generate and transmit notifications to the management device 100. Firstly, each DSLAM can perform monitoring and determine whenever a condition or set of conditions has arisen which requires a notification to be passed to the management device 100 in which case the DSLAM can generate the notification and send it to the element manager 25 (using, for example the well known SNMP protocol as illustrated in FIG. 2) whereupon the element manager 25 then simply forwards on the notification message to the management device (e.g. using a Remote Procedure Call (a well known Java based protocol) as illustrated in FIG. 2). Alternatively, each DSLAM can simply forward on a notification to the element manager each time a DSL synchronises (again for example using SNMP) and the element manager can process this information to determine if a notifiable event has occurred (e.g. such as the synchronisation line rate for a particular line having changed). Then if the element manager determines that such an event has occurred, it can generate and transmit (again using, for example an RPC) a suitable notification message to the management device 100. In this latter method of operation, a group of DSLAMs and their corresponding element manager form an access sub-system within the meaning of the term as used in the appended claims.

Figure 3:
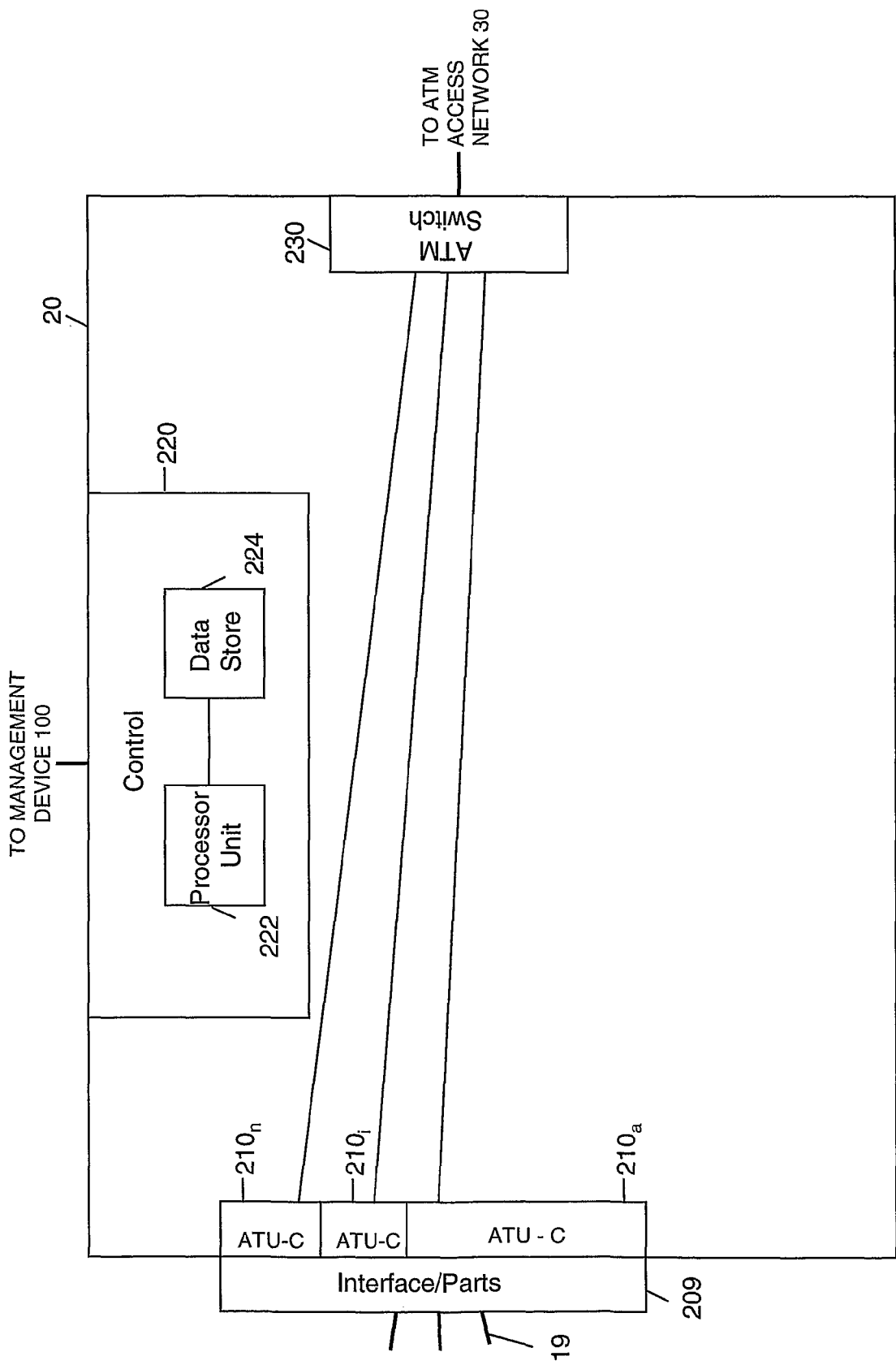
FIG. 3 is a schematic block diagram illustrating one of the DSLAMs of FIG. 1 in more detail.

Referring now to FIG. 3, this shows a DSLAM of FIG. 1 (or FIG. 2) in slightly more detail. Each incoming DSL line terminated by the DSLAM enters the DSLAM at one of a plurality of input ports in an interface module 209, which connects these to a plurality of modems, in this case a plurality of ADSL Terminating Units—Central office side (ATU-C's) 210a-n. The ATU-C's are connected to an ATM switch for forwarding on the data (in the form of ATM cells in the present embodiment) to an ATM switch 230 which switches the resulting cells onto the ATM access network 30. Within the DSLAM, there is a control unit 220 which includes a processor unit 222 and a data store 224. The control unit 220 performs various control functions including ensuring that each time a connection is made over a particular DSL that it complies with a stored profile for that line. As is well known within the field of xDSL, each line is set up according to a DSL profile which specifies various parameters necessary for establishing an xDSL connection.

In the present embodiment, the control unit 220 additionally performs the function of monitoring each DSL, determining if it has re-synchronised at a rate which differs from the rate at which it previously synchronised (or re-synchronised) and, if so, generating a notification message to send to the management device 100 (or to an element manager or other intermediate device in alternative embodiments including such devices). The steps carried out in performing this additional function are described below with reference to the flow diagram of FIG. 4.

Figure 4:
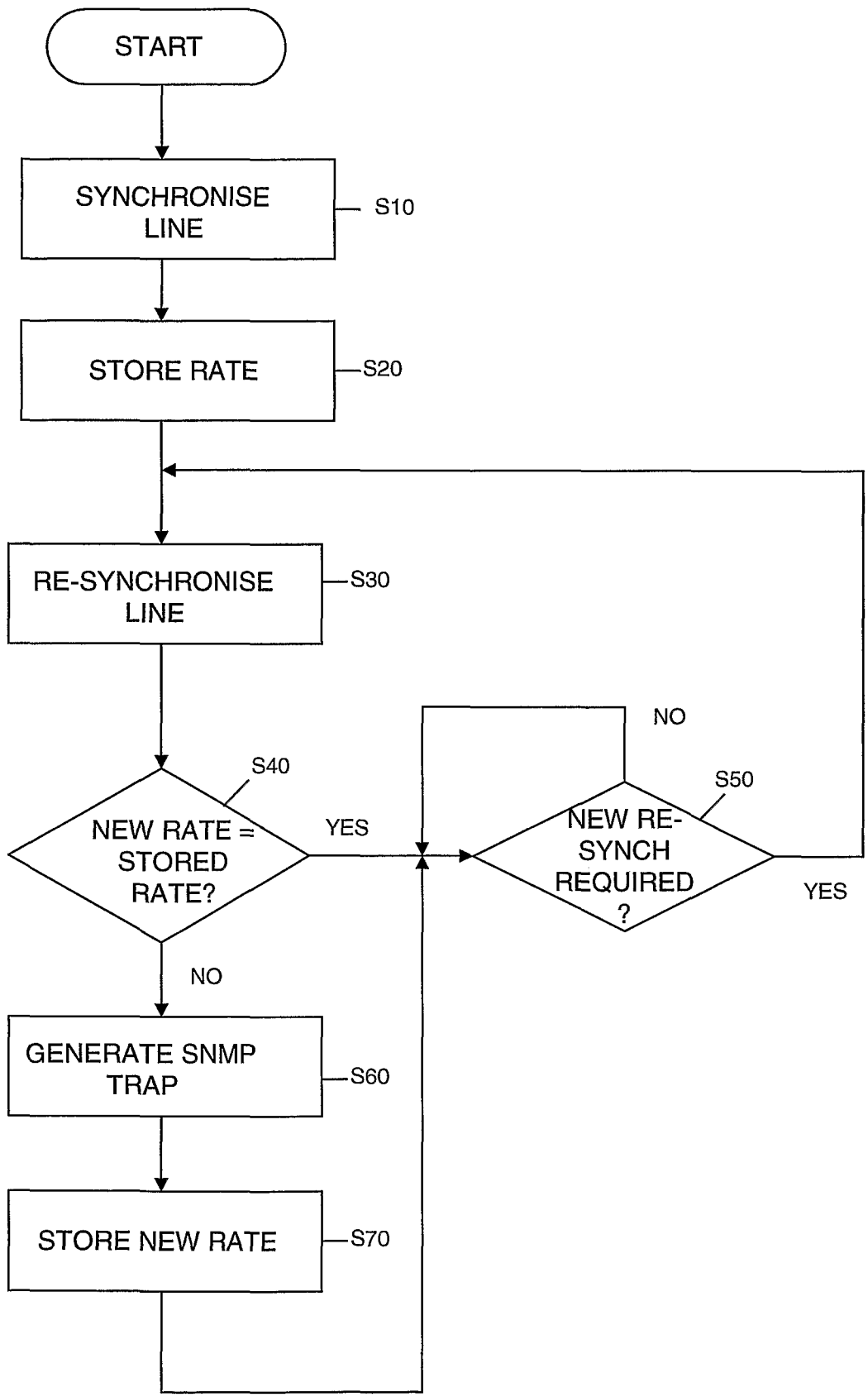
FIG. 4 is a flow diagram illustrating the steps carried out by the DSLAM of FIG. 3 to generate messages to send to the management device of the network of FIG. 1.

Thus, upon initiation of the method illustrated in FIG. 4 when a DSL line connected to the DSLAM is provisioned for monitoring by this new function (e.g. because the end user has opted to move his broadband connection service to a new rate adapted service), the first time it synchronises (step 10), the line rate achieved is stored (step S20). The control unit then waits until the next time that the line tries to re-synchronise (step S30) whereupon it determines (step S40) whether the new line rate at which the line has synchronised is the same as that at which it previously synchronised (note that for modems operating in accordance with the ADSL 1 standard, the line rate can only change in steps of 32 Kb (Kilo bits per second), thus only changes of 32 Kb or greater will be detected; in ADSL 2 this reduces to 4 Kb or so) and if so it waits (step S50) until a new re-synchronisation attempt is made whereupon the method loops back to the re-synchronisation step S30. If at step S40 it is determined that the line rate at which the line has re-synchronised is different to that which it has stored (corresponding to the rate at which the line previously re-synchronised), then the control unit generates a notification message in the form of a Simple Network Message Protocol (SNMP) trap which it transmits directly (or indirectly in alternative embodiments) to the management device 100 (step S60). The control unit then stores the new line rate for future comparisons (at step S70) before proceeding to step S50 to await a new request to resynchronise the line. Naturally, this function is performed in parallel in respect of each line which is terminated by the DSLAM.

The notification message includes a unique identification of the line to which it relates, a date and time stamp indicating when the line resynchronised and the new line rate (specifying both the new upstream rate and the new downstream rate—note that a change in either of these will, in the present embodiment, trigger a notification to be sent, though in alternative embodiments a change in only, say, the downstream rate could trigger such a notification).

It will be understood by a person skilled in the art that a number of different methods may be used to transmit the messages between the DSLAMs, element managers and the management device 100. In the embodiment of FIG. 1 an SNMP message is sent directly from the DSLAMs to the management device 100. However many other possibilities exist. For example, in the embodiment of FIG. 2 an SNMP message could be sent from the DSLAMs to the element manager which could then forward on the message using a CORBA interface or by means of a JAVA based Remote Procedure Call. Naturally, many other possibilities will occur to a person skilled in the art of data networking.

VARIATIONS

In alternative embodiments, instead of generating and sending notifications of changes of line rate equal to the granularity of the xDSL standard used, notifications could only be sent if the change is above a specified magnitude of change threshold (which could vary in dependence on the absolute value of the line rate). In this way, the number of notifications generated and sent could be reduced. Preferably, the threshold could be set to equal the threshold used for the purposes of reprovisioning the BRAS by the management device 100, which, in the present embodiment, is done in steps of 500 Kb.

Instead of, or in addition to, sending notifications of a change of line rate, a notification could be sent each time a line re-synchronises. This could be useful for identifying lines which are frequently going down, perhaps because the provisioning is incorrect and needs to be changed (e.g. to force the line to connect at a lower rate rather than at the maximum achievable rate).

Instead of, or in addition to, sending notifications of a change of line rate, the DSLAM or an element manager or other interface type device could monitor whether a particular line has had to re-synchronise more than a certain given number of times within a certain given period such as, for example, more than 10 times within an hour and send a notification to the management device whenever this condition is detected as occurring.

The invention claimed is:

1. An access device comprising:
   a plurality of digital subscriber line modems for terminating a plurality of corresponding digital subscriber lines and connecting the plurality of digital subscriber lines to an access network; and
   a control unit for monitoring one or more of the plurality of digital subscriber lines and generating and transmitting a message to a management device in dependence upon results of monitoring the one or more of the plurality of digital subscriber lines, wherein the control unit is configured to monitor, in respect of each line, whether the line has had to resynchronize more than a predetermined number of times within a predetermined period of time and is further configured to send a notification to the management device whenever the control unit determines from the monitoring that the line has had to resynchronize more than the predetermined number of times within the predetermined period of time.

2. The access device according to claim 1, wherein the access device is a Digital Subscriber Line Access Multiplexer.

3. The access device according to claim 1, wherein the notification includes an identification of the line in question together with a date and time stamp.

4. The access device according to claim 1, wherein the notification is generated and sent in accordance with a Simple Network Message Protocol.

5. An access sub-system comprising:
    a plurality of access devices each comprising
        a plurality of digital subscriber line modems for terminating a plurality of corresponding digital subscriber lines and connecting the plurality of digital subscriber lines to an access network, and
        a control unit for monitoring cane or more of the plurality of digital subscriber lines and generating and transmitting a message to a management de vice in dependence upon results of monitoring the one or more digital subscriber lines, wherein the control unit is configured to monitor, in respect of each line, whether the line has had to resynchronize more than a predetermined number of times within a predetermined period of time and is further configured to send a notification to the management device whenever the control unit determines from the monitoring that the line has had to resynchronize more than the predetermined number of times within the predetermined period of time; and
    an element manager, wherein the element manager receives notifications from the plurality of access devices, processes the notifications and, in accordance with results of the processing, generates one or more further notifications for onward transmission to a further management device.

6. An access network comprising:
    one or more access devices each comprising:
        a plurality of digital subscriber line modems for terminating a plurality of corresponding digital subscriber lines and connecting the plurality of digital subscriber lines to an access network, and
        a control unit for monitoring one or more of the plurality of digital subscriber lines and generating and transmitting message to a management device in dependence upon results of monitoring the one or more digital subscriber lines, wherein the control unit is configured to monitor, in respect of each line, whether the line has had to resynchronize more than a predetermined number of times within a predetermined period of time and is further configured to send a notification to the management device whenever the control determines from the monitoring that the line has had to resynchronize more than the predetermined number of times within the predetermined period of time;
    a management device configured to receive notifications from the one or more access devices and modify one or more settings within a respective access device or another network component upstream of the respective access device in response to the received notifications.

7. A method of operating an access device including a plurality of digital subscriber line modems for terminating a plurality of corresponding digital subscriber lines and connecting the digital subscriber lines to an access network, the method comprising:
    monitoring one or more of the digital subscriber lines by a control unit of the access device;
    determining, by the control unit, in respect of each line, whether the line has had to resynchronize more than a predetermined number of times within a predetermined time period; and
    generating and transmitting a notification from the access device to the management device if the determining indicates the line has had to resynchronize more than the predetermined number of times within the predetermined time period.

8. A non-transitory computer-readable medium carrying instructions executable by a computer for causing an access device, including a plurality of digital subscriber line modems for terminating a plurality of corresponding digital subscriber lines and connecting the digital subscriber lines to an access network, to operate in accordance with a method comprising:
    monitoring one or more of the digital subscriber lines by a control unit of the access device;
    determining, by the control unit, in respect of each line, whether the line has had to resynchronize more than a predetermined number of times within a predetermined period; and
    generating and transmitting a notification from the access device to the management device if the determining indicates the line has had to resynchronize more than the predetermined number of times within the predetermined time period.

9. The access network of claim 6, comprising a plurality of access devices that form part of an access sub-system, the access sub-system further comprising an element manager, wherein the element manager receives notifications from the plurality of access devices, processes the notifications and, in accordance with results of the processing, generates one or more further notifications for onward transmission to a further management device.

* * * * *